May 18, 1965 A. CHADWICK 3,183,667
FUEL CONTROL SYSTEM FOR A GAS TURBINE ENGINE
Filed Nov. 5, 1962 3 Sheets-Sheet 1
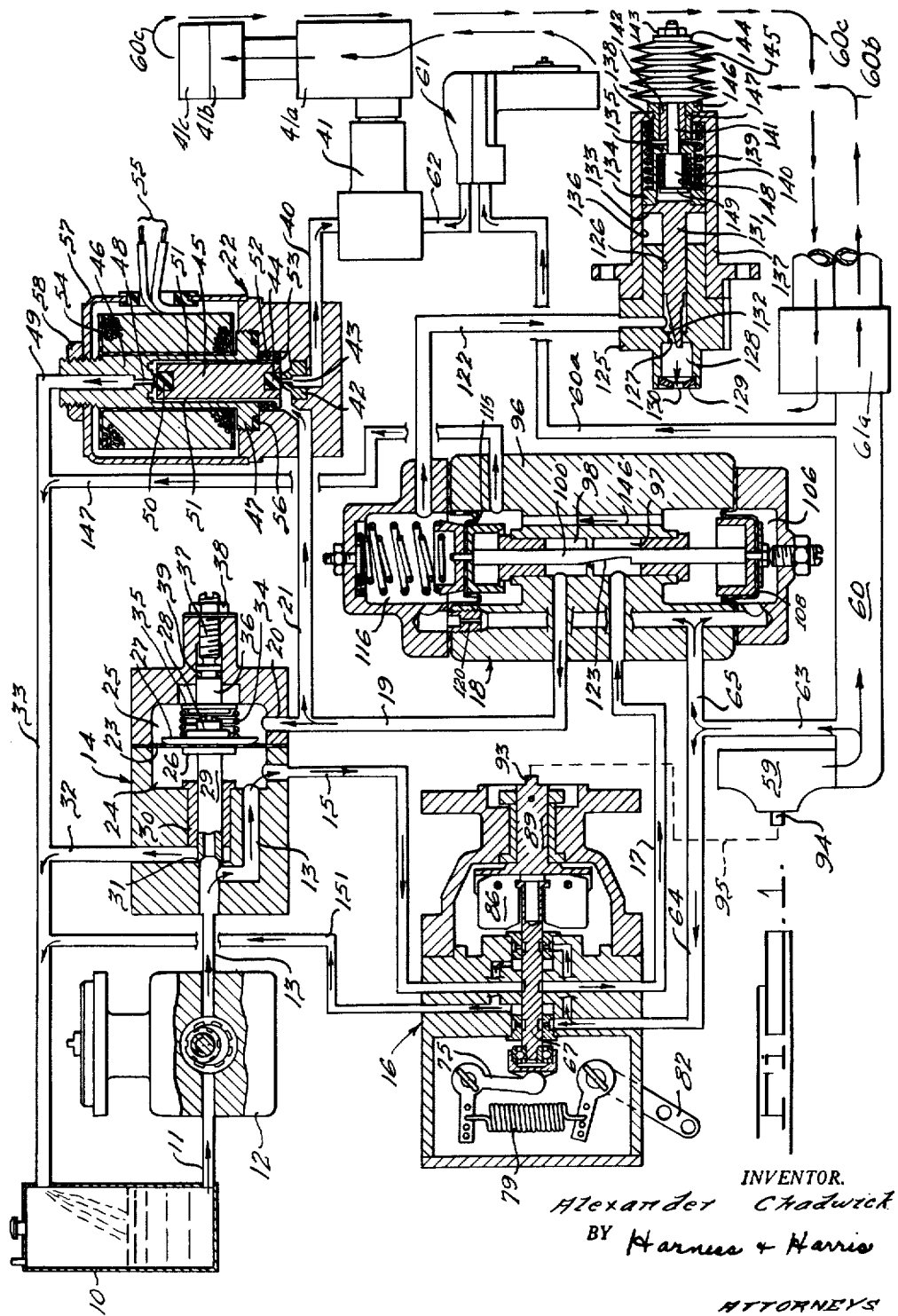
INVENTOR.
Alexander Chadwick
BY Harness + Harris
ATTORNEYS

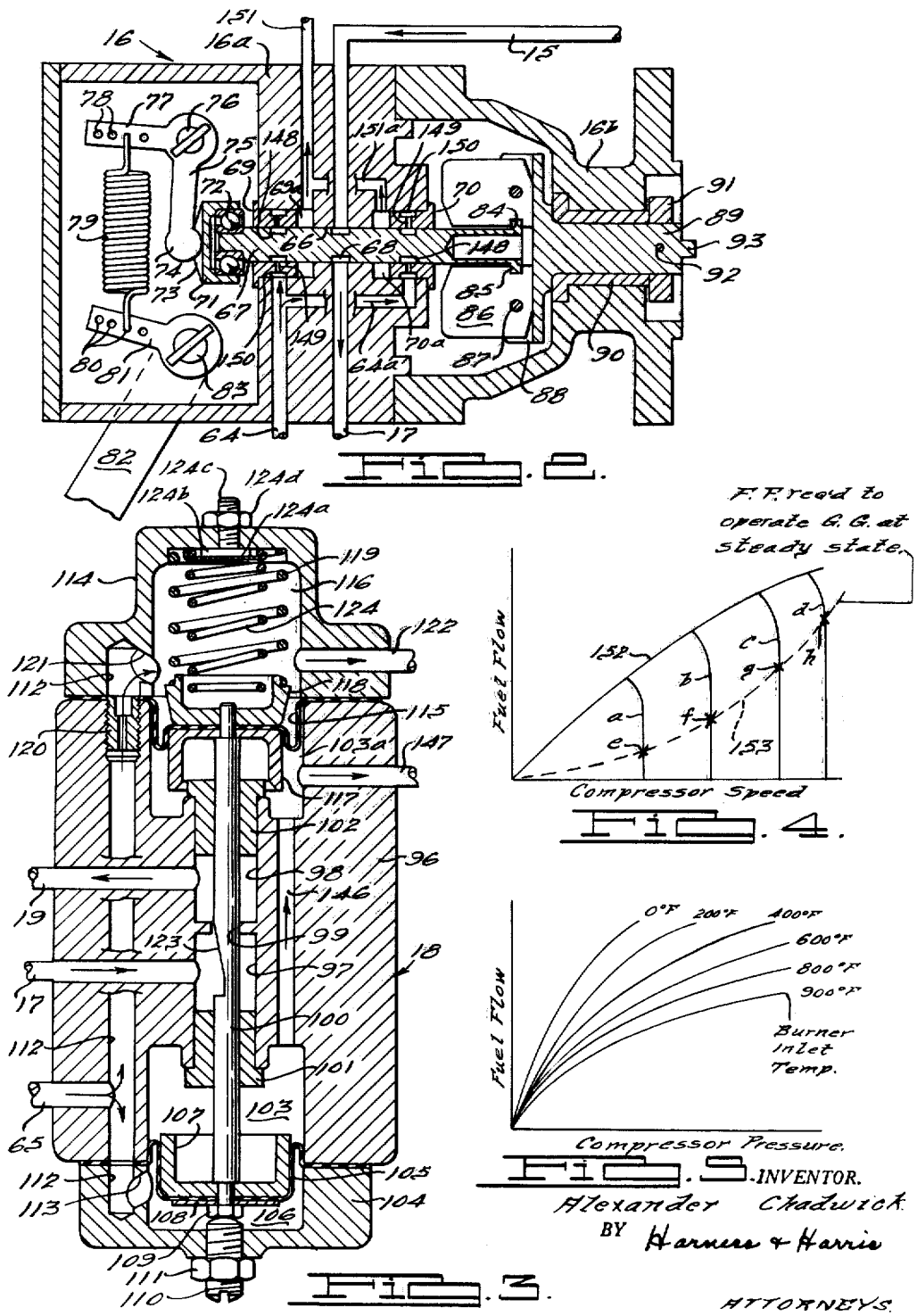

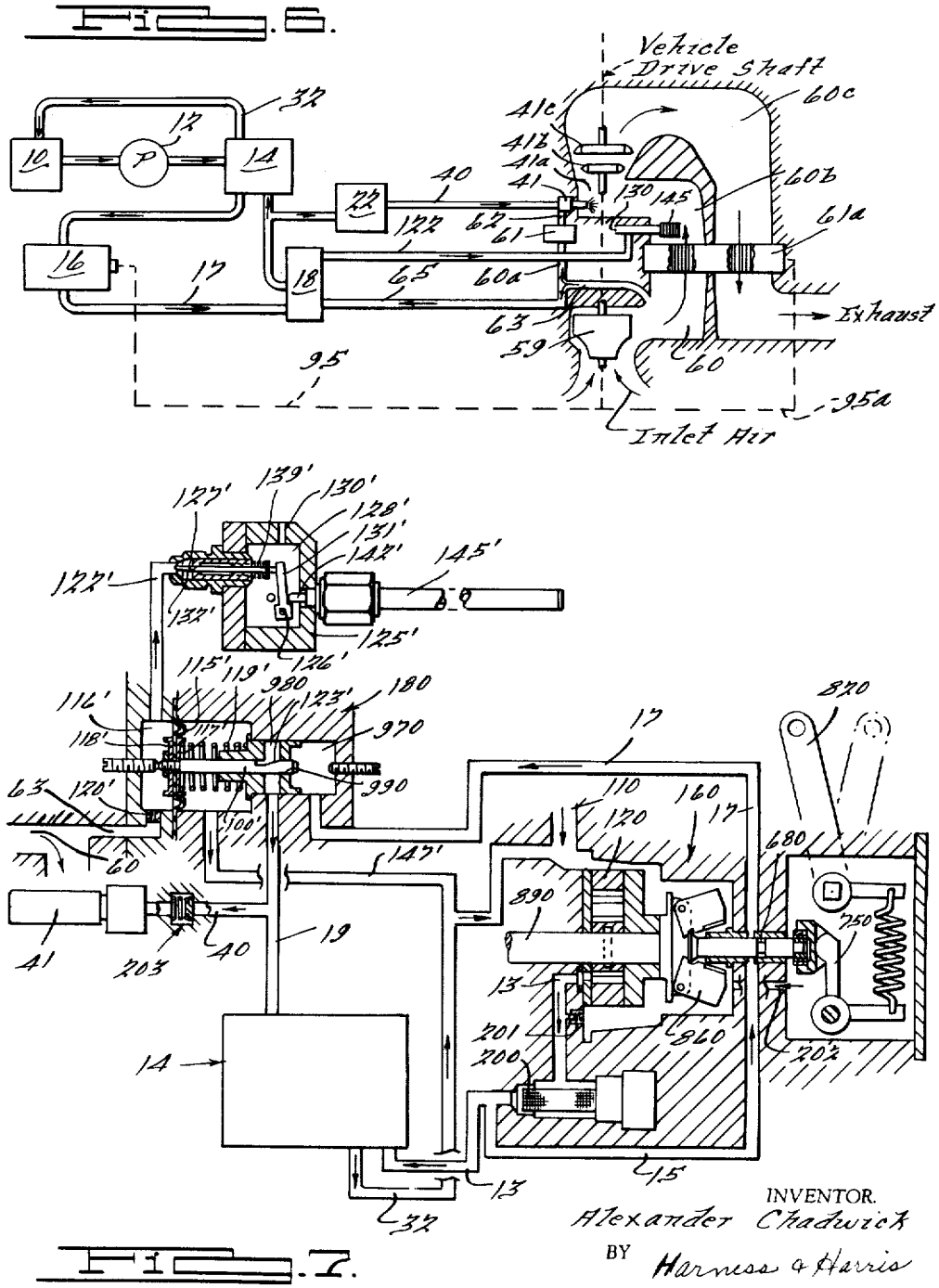

3,183,667
FUEL CONTROL SYSTEM FOR A GAS TURBINE ENGINE

Alexander Chadwick, Farmington, Mich., assignor to Chrysler Corporation, Highland Park, Mich., a corporation of Delaware
Filed Nov. 5, 1962, Ser. No. 235,442
3 Claims. (Cl. 60—39.28)

This application is a continuation-in-part of copending application S.N. 27,765, filed May 9, 1960, now abandoned.

This invention relates to improvements in a fuel supply system particularly adapted for use with an automotive type gas turbine engine having an engine driven compressor for supplying combustion supporting air.

In a typical automotive gas turbine engine, as for example of the type illustrated in Huebner et al., Pat. No. 2,795,928 or Chadwick et al., Pat. No. 3,044,262, combustion supporting air from the compressor is preheated by a regenerator and discharged into a combustion chamber into which fuel is also added and burned. The hot combustion products are then conducted through the rotor stages of a two-stage gas driven rotor assembly to drive the same, whereupon the exhaust gases are conducted through the regenerator to heat the same and are thereafter exhausted to atmosphere. Reference is hereby made to the above-named patents for details of a gas turbine engine of the type with which the present invention is adapted to be used.

In such engines, the two rotor stages are rotatable independently of each other, the first rotor stage being employed to drive the air compressor and regenerator, the second rotor stage being employed to propel the vehicle. It is important to schedule fuel to the engine in accordance with the air output of the compressor so as to maintain the desired fuel-air ratio required to maintain an optimum temperature in the combustion chamber. It is also important, when increased power is required from the engine, to increase the supply of combustion supporting air rapidly until the desired steady state of engine operation at the increased power level is attained. Accordingly in such circumstances, the increased power is first directed primarily to the rotor stage which drives the compressor, thereby to accelerate the latter to supply the combustion supporting air necessary to support the increased fuel combustion at the higher power level. Thereafter a larger proportion of the power is directed to the rotor stage which propels the vehicle.

An important object of the present invention is to provide an improved fuel metering system for an automotive gas turbine engine of the above character having an adjustable speed governed fuel throttle valve and a pressure responsive fuel scheduling valve arranged in series and employed with a fuel pressure regulator adapted to maintain a constant fuel pressure differential across the two valves in series. The throttle valve is adapted to remain fully open for maximum fuel flow during acceleration of the air compressor and is adjustable to restrict the fuel flow when the compressor attains a predetermined speed corresponding to the adjustment of the throttle valve. The scheduling valve is responsive to the discharge air pressure of the compressor to increase the fuel flow as the pressure of the combustion supporting air increases.

Another object is to provide a fuel supply system of the above type having an improved throttle valve. The latter comprises a valve housing having a cylindrical chamber for an axially shiftable cylindrical valve shaft rotatable within the chamber and substantially filling the latter's cross sectional area. An annular fuel receiving groove in the valve shaft is arranged to provide communication between an inlet port and an outlet port, opening into said chamber. The ports and groove comprise part of the fuel supply system and are in maximum communication when the throttle valve is fully open. Adjustable throttle biasing means resiliently engageable with one end of the shaft urges the latter in one axial direction to maintain communication between the groove and ports with a force determined by the position of adjustment of the throttle biasing means. Governor means responsive to the speed of the compressor engages the other end of the shaft to urge the latter in opposition to the biasing means with a force comprising a direct function of the compressor speed, thereby to overcome the biasing force and shift the shaft axially to move the fuel receiving groove out of alignment with the inlet and outlet ports to restrict communication therebetween when the compressor attains a predetermined speed.

Another object is to provide an improved pressure responsive fuel scheduling valve for a fuel supply system of the above character comprising a valve body having a fuel duct therein which defines a portion of the fuel supply system. A shiftable valve element of the scheduling valve is provided for the fuel duct to schedule the fuel flow therethrough and is actuated in accordance with the compressor discharge air pressure and also in accordance with the temperature of the preheated air discharged from the regenerator and upsteam of the combustion chamber.

In one embodiment of the invention, the actuating means for the scheduling valve element comprises first and second pressure responsive means responsive to the compressor discharge air pressure and employed in opposition to each other, the first urging the scheduling valve element in a direction tending to increase the fuel supply to the engine and the second urging said valve element oppositely to decrease the fuel supply. The air pressure supply to the second pressure responsive means is restricted with respect to the air pressure supply to the first pressure responsive means. An adjustable vent is provided to vent the air pressure actuating the second pressure responsive means in accordance with the temperature of said preheated inlet gases to the combustion chamber, the vent being progressively restricted as said temperature increases. Thus as the temperature of the burner inlet gases rises and less fuel is required to maintain the combustion chamber at an optimum temperature for a given engine load, the actuating air pressure for the second pressure responsive means opposing the first pressure responsive means increases and the valve element is shifted to reduce the fuel supply.

In another modification of the invention, the actuating means for the scheduling valve element comprises a single pressure responsive means actuated by the pressure of the compressor discharge air supplied through a restricted orifice and vented to atmosphere via an adjustable vent downstream of the restricted orifice. As in the former embodiment, the adjustable vent is controlled by the temperature of the preheated inlet air to the combustion chamber but is progressively restricted with decreasing temperature in order to effect a corresponding increase in the actuating pressure for the pressure responsive means.

By virtue of employing the two metering valves of the types described in series, a particularly effective and reliable fuel metering system is achieved which is highly responsive to the pressure and temperature of the inlet air with which the fuel is admixed, and enables a predetermined control of the fuel flow characteristics and the fuel-air ratio during both accelerating and steady state operating conditions that has not been possible heretofore with a metering system of comparable simplicity and economy. The pressure of the air discharged from the compressor upstream of the regenerator, and the temperature of the preheated burner inlet air discharged from the regenerator upstream of the combustion chamber, are the most effective and feasible parameters for controlling the fuel flow to the gas turbine engine during rapidly changing driving conditions. In accordance with the present invention, these parameters are employed to optimum advantage.

Other objects of this invention will appear in the following description and appended claims, reference being had to the accompanying drawings forming a part of this specification wherein like reference characters designate corresponding parts in the several views.

FIGURE 1 is a diagrammatic view of a fuel supply system embodying the present invention.

FIGURE 2 is an enlarged diagrammatic view of the throttle assembly illustrated in FIGURE 1.

FIGURE 3 is an enlarged diagrammatic view of the fuel scheduling assembly illustrated in FIGURE 1.

FIGURE 4 is a family of curves corresponding to various power requirements showing the general relationship between fuel flow on the ordinate and compressor speed on the abscissa.

FIGURE 5 is a family of curves corresponding to various temperatures of the burner inlet gases, showing the general relationship between the fuel flow on the ordinate and compressor discharge pressure on the abscissa.

FIGURE 6 is a diagrammatic view of a gas turbine engine, including the fuel and air system embodying the present invention.

FIGURE 7 is a diagrammatic view of a modification of the fuel system illustrated in FIGURE 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings and in particular in FIGURE 1, an embodiment of the present invention is illustrated by way of example including a fuel tank 10 connected by means of a fuel pump supply conduit 11 with the inlet side of a fuel pump 12. The high pressure side of pump 12 discharges by means of conduit 13 to the high pressure side of a differential pressure relief valve indicated generally by the numeral 14. A fuel conduit 15 connects the high pressure side of relief valve 14 with the high pressure side of throttle assembly 16, the low pressure side of the latter discharging via conduit 17 to the high pressure or inlet side of a fuel scheduling valve assembly 18. Metered fuel from the low pressure or outlet side of scheduling valve 18 is discharged via conduit 19 which bifurcates at 20 and 21 to conduct the metered fuel to the low pressure side of relief valve 14 and to solenoid valve 22 respectively.

Relief valve 14 serves as a pressure regulator to maintain a substantially constant pressure differential across the fuel control system comprising the throttle and scheduling valve assemblies 16 and 18 and includes a two-part housing partitioned by a flexible diaphragm 23 to provide a high pressure side or chamber 24 in communication with conduit 13 and a low pressure side or chamber 25 in communication with conduit 20 as aforesaid. A pair of clamping elements 26 and 27 at opposite sides of diaphragm 23 are secured by a screw 28 to an axially shiftable plunger 29 and maintain a leak-proof separation between chambers 24 and 25. Plunger 29 is reciprocable within a cylindrical bushing 30 press fit into a mating opening in the left body portion of valve 14 coaxially with a portion of pump discharge conduit 13. The left end of plunger 29 is adapted to seat against an annular valve seat 31 around a port opening into conduit 13 so as to block communication between the latter and a pressure relief conduit 32 in communication with a drain conduit 33 connected with tank 10.

Plunger 29 is normally urged to the left to close the communication between conduits 13 and 32 by means of biasing spring 34 seated under compression between a portion of clamping member 27 and an axially adjustable spring retainer 35 secured to the left end of a plunger 36. The latter is axially adjustable within a mating bore in the right portion of the housing for valve 14 and extends coaxially with plunger 29. Axial adjustment of plunger 36 is accomplished by means of screw 37 screwed into the right end of valve housing 14 and secured in adjusted position by a nut 38. An annular seal 39 around plunger 36 prevents fuel leakage from the interior of chamber 25.

It is apparent that when the pressure differential between chambers 24 and 25 tends to exceed a predetermined value determined by the resilient force or tension of spring 34, diaphragm 23 will be urged rightward to unseat the left end of plunger 29 from seat 31 and thereby to open communication between pump discharge conduit 13 and the pressure relief or bypass conduit 32 to maintain the desired constant pressure differential.

The solenoid valve 22 comprises a lower body portion containing a portion of fuel supply duct 21 and also a portion of fuel supply duct 40 which discharges to an air using fuel atomizing nozzle 41. A valve seat 42 secured within the lower housing portion of valve 22 is provided with a central port or passage 43 in communication with conduit 40 and normally closed at its upper end by a lower sealing element 44 carried by a plunger 45 when the engine is not running. Plunger 45 is reciprocable vertically in a mating bore within a vertical guide 46 having a lower enlarged portion 47 screwed into the lower body portion of valve 22. The plunger receiving portion of the bore of guide 46 communicates via a coaxial port 48 with a bypass conduit 49 which in turn communicates with drain conduit 33. An upper sealing element 50 carried by plunger 45 is effective to close port 48 when plunger 45 is raised by operation of the solenoid. Otherwise, as illustrated in FIGURE 1, port 48 is in communication with the upper end of the plunger receiving bore portion of guide 46 and with a plurality of axially extending grooves 51 in the outer periphery of plunger 45, communicating in turn with supply conduit 21.

When the engine is not running, solenoid valve 22 is deenergized and plunger 45 is urged downwardly to the position shown by means of a coil spring 52 seated under compression between a lower radial flange 53 of plunger 45 and the lower guide portion 47, thereby to close port 43. When the engine is operating, solenoid coil 54 is energized by means of electrical terminals 55 so as to raise plunger 45, thereby to close port 48 and open port 43 to establish communication between fuel supply conduits 21 and 40. A suitable seal 56 is provided between the lower guide portion 47 and the lower housing portion of valve 22 to prevent leakage of fuel into the coils of solenoid 54. The latter are enclosed within a housing cap 57 secured in position by a nut 58 screwed on an upper extension of guide 46.

The combustion supporting air supply system includes a compressor 59, FIG. 6, which is suitably driven by the first gas turbine rotor stage 41b as aforesaid. The pressurized discharge air from the compressor 59 is conducted by conduit 60 to a portion of regenerator 61a where it is preheated. The preheated air discharged from generator 61a is conducted by conduit 60b to the combustion chamber 41a to support the combustion of fuel added via nozzle 41. From the combustion chamber 41a, the hot combustion products are directed through the rotor stages 41b and 41c to rotate the same and are returned by conduit 60c to a second portion of the regenerator 61a. The regenerator 61a utilizes heat from the exhaust combustion products to preheat the inlet air passing through the regenerator 61a from the compressor 59. Also as indicated in FIGURE 6, the second rotor stage 41c is rotatable independently of rotor stage 41b and is suitably connected with the driving wheels of the vehicle to propel the latter.

A branch conduit 63 from conduit 60 branches into an air sealing conduit 64 for the throttle valve and an actuating conduit 65 for the scheduling valve. A branch conduit 60a carries a relatively small portion of the combustion air supply to an air booster pump 61 which discharges at higher pressure via duct 62 to nozzle 41 to atomize the fuel supplied thereto. Nozzle 41 discharges the fuel-air mixture into the combustion chamber where the mixture is burned with the main body of air supplied by conduit 60. In the above regard, the fuel supply system is independent of the type of nozzle employed. The preferred nozzle 41 is of the type which employs both fuel pressure and high pressure air for the fuel atomization. However, a low pressure fuel nozzle could be employed, in which case pump 61 would be omitted.

Referring to FIGURE 2, details of the throttle valve assembly 16 are illustrated wherein a body portion 16a is provided with a cylindrical bore 66 extending therethrough and intersecting conduits 15 and 17 which extend into the body portion 16a. An axially shiftable valve shaft 67 journalled in the bore 66 is provided with an annular coaxial fuel receiving groove 68 in its outer periphery adapted to align with the ends of conduits 15 and 17 at their openings into chamber 66. Adjacent the left and right ends respectively of chamber 66, the latter is enlarged to receive annular bushings 69 and 70 which provide bearing supports for the shaft 67. The left end of shaft 67 extends axially beyond bushing 69 and is reduced in diameter to receive a cup-shaped cap 71 journalled thereon by means of bearing assembly 72. The left outer face of cap 71 is dished at 73 to receive the ball end 74 of a swinging arm 75 pivoted at 76 on the housing portion 16a. A dog leg extension 77 of arm 75 is provided with a plurality of spring retaining holes 78, one being engaged with one end of a coil spring 79. The other end of spring 79 is received within one of a plurality of holes 80 in the dog leg extension 81 of a throttle lever 82 pivoted at 83 on body portion 16a.

It is apparent that counterclockwise pivoting of throttle lever 82 increases the tension in spring 79 tending to swing arm 75 counterclockwise to urge its ball end 74 against cap member 71. Thus shaft 67 is yieldably urged rightward to its limit of movement whereat annular groove 68 is aligned with the juxtaposed open ends of fuel supply conduits 15 and 17 to connect the same. The plurality of openings 78 and 80 enable initial adjustment of the biasing tension of spring 79.

In order to oppose the force of spring 79 urging rightward movement of shaft 67 with a force determined by the position of angular adjustment of throttle lever 82, the right end of shaft 67 extends axially beyond bushing 70 and terminates in a radial flange 84. The flange 84 extends within notches 85 formed in a plurality of flyweights 86 pivoted at 87 on a collar member 88 integral with the left end of a governor shaft 89. The pivots 87 extend tangentially to an arc coaxial with shaft 67, so that upon rotation of shaft 89, centrifugal force will urge the flyweights 86 radially outward with respect to the coaxial axes of shafts 67 and 89 and thereby urge the former shaft leftward by virtue of the engagement of flange 84 within notches 85.

It is apparent that the greater the speed of rotation of governor shaft 89, the greater will be the centrifugal force acting on flyweights 86 tending to urge shaft 67 against the tension of spring 79. Shaft 89 is also journalled within a housing portion 16b of throttle assembly 16 by means of an annular bushing 90 and is retained in position by means of a ring 91 secured coaxially to shaft 89 by means of a diametrically extending pin 92. An extension 93 of shaft 89 is suitably coupled as indicated by dotted line 95 with shaft extension 94 of the compressor 59 for operation in unison therewith. Accordingly the speed of rotation of governor shaft 89 will be directly related to the speed of rotation of compressor 59 and the discharge air pressure of the latter in conduit 60. The regenerator 61a is preferably of the rotatable disc type comprising a multitude of axial gas passages, FIG. 6, and is suitably coupled as indicated by dotted line 95a with the compressor 59 for rotation therewith, but at greatly reduced speed.

As described above, during increasing load on the engine, additional power is first delivered to the compressor 59 in order to supply the combustion supporting air for the increased fuel required by the increased load. The compressor will thus rapidly gain speed until it attains a speed corresponding to the setting of throttle lever 82. At this speed, the centrifugal force acting on flyweights 86 will be sufficient to overcome the tension of spring 79 and will urge shaft 67 leftward to restrict the communication between conduits 15 and 17. Accordingly the compressor speed will level at a steady state of operation determined by the setting of throttle lever 82. The air pressure supplied to conduit 60 will also attain a steady state condition and give rise to a corresponding fuel flow as described below which is necessary for the power requirement determined by the setting of throttle 82. In the above regard the opening into conduit 17 from groove 68 serves as a fuel metering orifice which is sharply restricted by valve shaft 67 when the compressor speed attains the value determined by the setting of throttle 82, as described below in conjunction with FIG. 4.

The fuel scheduling valve assembly which receives fuel from the throttle assembly 16 comprises a central body portion 96 having a high pressure fuel inlet chamber 97 in communication with fuel conduit 17 and a low pressure fuel discharge chamber 98 in communication with fuel conduit 19. The chambers 97 and 98 are in communication with each other during operation of the engine by means of a circular metering orifice 99 through which passes a cylindrical metering rod 100. The latter extends lengthwise through the body 96 and nearly fills the orifice 99 at the position shown in FIG. 3 when the engine is not operating. The opposite ends of shaft 100 extend slidably through sealing bushings 101 and 102 which close chambers 97 and 98 respectively.

The upper and lower ends of shaft 100 in FIG. 3 extend endwise into exhaust chambers 103a and 103, the latter being closed by a cup-shaped end cap member 104 and a flexible pressure actuated diaphragm 105. The cap member 104 is suitably secured to the body portion 96 and clamps the peripheral portions of diaphragm 105 firmly in position, whereby the latter partitions chamber 103 from a high pressure actuating chamber 106 within cap member 104. Clamping members 107 and 108 at opposite sides of diaphragm 105 clamp the latter to a reduced lower end extension of rod 100 and are secured in place to effect a fluid tight seal between chambers 103 and 106 by means of nut 109 screwed on the aforesaid end extension. An adjustable stop 110 screws into chamber 106 through the end wall of cap 104 and is retained in adjusted position by a nut 111. Extending lengthwise of the body portion 96 and partially into the cap member 104 is an air duct 112 in communication with the compressor discharge air via duct 65. A short air duct 113 connects duct 112 with chamber 106 to supply actuating air pressure thereto.

The upper end of body 96 is covered by a cup-shaped member 114 which secures the peripheral edges of a flexible diaphragm 115 in position. The latter partitions chamber 103a from a low pressure actuating chamber 116 in cup member 114. A pair of clamping elements 117 and 118 at opposite sides of diaphragm 115 secure the latter to the upper reduced end extension of shaft 100 and are maintained in position by a biasing spring 119 under compression between the end wall of cup 114 and clamping element 118. In order to reduce the actuating pressure in chamber 116 with respect to the actuating pressure in chamber 106, a restriction plug 120 having a restricted orifice is screwed into conduit 112 at the upper end of body portion 96. Conduit 112 extends downstream of the restriction 120 into a portion of the sidewall of cup 114 and communicates with chamber 116 by way of a short conduit 121. Thus chamber 116 is in commnunciation with conduit 65 by way of conduit 112, the restriction 120, and duct 121. Chamber 116 is also vented to atmosphere by vent conduit 122 as described in more detail below.

As the speed of operation of the air compressor 59 increases, the pressure in conduits 65 and 112 increases correspondingly and the pressure drop across restriction 120 will increase for any given vent opening afforded by conduit 122. Accordingly as the compressor discharge pressure increases, the pressure in chamber 106 increases with respect to the pressure in chamber 116 so as to urge metering rod 100 upward in FIG. 3 against the force of spring 119. Rod 100 is provided with an axially tapered metering portion 123 which is adapted to register with metering orifices 99 to progressively increase the fuel flow therethrough from chamber 97 to chamber 98 upon the aforesaid upward movement of rod 100. Accordingly as the compressor discharge pressure increases to supply an increased amount of combustion supporting air, the fuel flow from conduit 17 to conduit 19 and thence through solenoid valve 22 to nozzle 41 is increased.

The effective cross sectional area of diaphragm 105 exposed to the pressure in actuating chamber 106 is greater than the effective cross sectional area of diaphragm 115 exposed to the actuating pressure of chamber 116. Accordingly in the event that vent duct 122 is completely closed during operation of the system as explained below, the pressure in chamber 106 will still operate to move metering rod 100 upward in FIG. 3 against the biasing force of spring 119.

In order to facilitate operation of the fuel scheduling assembly during engine starting conditions when both the compressor discharge air pressure and the fuel flow are comparatively low, spring 119 has a comparatively low spring rate and is readily compressed by a comparatively small actuating air pressure in chamber 106, as for example when compressor 59 is operated slowly by a starting motor. A second spring 124 having a somewhat greater spring rate than spring 119 is secured to the upper end wall of cap member 114 by means of a clamp 124a. The latter is secured to the under side of a plate 124b having a threaded shank 124c which extends through the end wall of cup member 114 and is retained in position by a nut 124d. The lower end of spring 124 is suspended above clamping element 118 and only engages the latter to resist upward movement of rod 100 when the engine load tends to exceed idling conditions.

The vent conduit 122 extends radially into the body portion 125 of a temperature responsive vent control assembly. An axial bore 126 in the body 125 intersects conduit 122 and communicates axially with a reduced metering orifice 127, FIG. 1. The latter opens into a chamber 128 within the body 125 which is partially closed by a closure member 129 having a central exit 130. A plunger 131 extending coaxially within the bore 126 terminates at its leftward end in an axially tapered metering portion 132 registering with orifice 127. The right end of plunger 131 enlarges at 133 and is secured to a flange 134 of a cup-shaped spring-biased plunger 135. The flanges 133 and 134 have the same outer diameter and are slidably confined in guided relationship within the bore 136 of a second housing portion 137 suitably secured to housing portion 125. The right end of cylindrical chamber 136 is partially closed by an inbent flange 138 of housing 137 to provide a retainer for a coil spring 139 under compression between the flanges 138 and 134 urging the latter and plunger 131 leftward and tending to close metering orifice 127.

The leftward movement of plunger 131 is resisted by an enlarged head 140 confined within cup-shaped plunger 135 and integral with a coaxial shaft 141 which extends axially through the base of plunger 135 and a sliding bushing 142 and terminates in a screw threaded end exteriorly of the latter bushing. A nut 143 is screwed on the threaded end of shaft 141 against a radial flange 144 of bushing 142. A plurality of resilient bimetallic elements 145 are arranged around bushing 142 under compression between flange 144 and an external flange 146 of a bushing 147 which is press fit into the circular opening within flange 138. Thus the elements 145 yieldingly resist leftward movement of the assembly including bushing 142, shaft 141 and its integral head 140, cup-shaped plunger 135, and the attached plunger 131.

The bimetallic temperature responsive elements 145 are constructed to contract axially with increasing temperature and in the present instance are exposed to the temperature of the preheated burner inlet gases downstream of regenerator 61a. As the temperature of the latter gases increases, so that a decreasing proportion of fuel is required to be burned in the combustion chamber in order to raise the temperature of the combustion products to the optimum operating condition for the engine, the elements 145 contract axially to enable the tension of spring 139 to force plunger 131 leftward and thereby to reduce the vent orifice 127. In consequence, the pressure in actuating chamber 116 will increase to assist the force of springs 119 and 124 in urging rod 100 downward in FIG. 3 to restrict the metering orifice 99. Thus as the temperature of the burner inlet gases increases, the fuel supply to the burner is correspondingly decreased as is desirable.

In order to maintain a small tension on the elements 145 in the event of overheating and excess contraction of the latter, a small spring 148 is provided around the enlarged head 140 under compression between the base of cup-shaped plunger 135 and a radially enlarged flange 149 integral with the head 140. Except when the elements 145 are in an overheated and extremely contracted condition, the resilient tension of the latter against flange 144 urging shaft 141 and head 140 rightward will normally maintain spring 148 in a bottomed condition. The latter spring is useful as aforesaid only in the event of overheating of the bimetallic elements 145.

In order to enable freedom of axial movement of shaft 100 in response to the pressure differential acting on diaphragms 105 and 115, the drain chambers 103 and 103a are connected by conduit 146. Chamber 103a is also connected by drain conduit 147 with fuel return line 33. Accordingly fuel leakage axially along rod 100 into either chamber 103 or 103a is returned to tank 10 and the latter chambers are maintained at the pressure of tank 10, which is atmospheric in the present instance.

Also comprising part of the fuel return system are a pair of annular sealing grooves 148 provided coaxially in the periphery of shaft 67. The grooves 148 are spaced by groove 68 and are located at the regions of the bushings 69 and 70 respectively. Each groove 148 is connected by a plurality of radial ducts 149 in the corresponding bushing 69 or 70 with an annular outer groove 150 in the latter bushing, the grooves 150 in the bushings 69 and 70 being connected with the discharge air from compressor 59 by means of ducts 64 and 64a respectively. The bushings 69 and 70 are snugly fitted into coaxial cylindrical chambers 69a and 70a respectively which extend axially toward the central groove 68 to a greater extent than do the bushings 69 and 70 so as to provide annular drain chamber portions in communication with the periphery of shaft 67 at locations between groove 68 and each of the grooves 148. These drain chamber portions are connected in turn by conduits 151 and 151a with the fuel return line 33. Accordingly fuel leakage from groove 68 axially in either direction along shaft 67 will enter the chambers 69a and 70a and will then be returned by the drain conduits 151 and 151a to fuel return line 33. The comparatively high pressure air from compressor 59 in communication with shaft 67 at the region of the grooves 148 serves as air seals to prevent axial endwise leakage of the lower pressure fuel beyond these grooves.

A summary of the operation of the overall fuel control system is explained in reference to FIGS. 4 and 5. During engine starting conditions when the compressor speed and the air pressure in line 60 are comparatively low, throttle metering valve plunger 67 will be urged to the right by the tension of spring 79 so as to maintain groove 68 in alignment with fuel ducts 15 and 17. In this condition, the fuel flow will be unrestricted except by the scheduling valve 18.

If the throttle lever 82 is moved to an idle position so as to maintain a comparatively light tension in spring 79 resisting leftward movement of throttle valve shaft 67, the fuel flow will increase with gradually increasing compressor speed as indicated by curve 152 of FIG. 4. Finally, when the compressor speed attains the value at which the centrifugal force acting on flyweights 86 begins to cause shifting of shaft 67 leftward so as to restrict the communication between fuel supply conduits 15 and 17, the fuel flow will drop rapidly along curve a to the idle fuel level e on dotted curve 153 which defines the fuel required to operate the compressor 59 at a steady state.

In the event that the throttle 82 is then shifted counterclockwise to accelerate the engine or to compensate for increased load thereon, the metering valve shaft 67 will again be shifted to provide substantially unrestricted communication between conduits 15 and 17 and the rate of fuel flow will increase rapidly, as determined by valve 100, to the curve 152. The compressor speed will then rapidly increase and the fuel flow will again increase with the increased compressor speed along curve 152 until the flyweights 86 cause leftward shifting of shaft 67 and restriction of the fuel flow through conduits 15 and 17, as for example as indicated by the curves b, c, and d which correspond to three different settings of the throttle lever 82. The fuel supply will then drop to the corresponding point f, g, or h on the steady state fuel flow curve 153 whereat resulting fuel flow to nozzle 41 is determined by the steady state velocity of compressor 59. The rate of fuel flow during the accelerating or non-steady state condition indicated by curve 152 is determined by the compressor discharge pressure in conduit 60 applied to chamber 106 to urge metering rod 100 upward in FIG. 3 against the tension of springs 119 and 124 and the reaction air pressure in chamber 116.

It is apparent that the two metering valves 16 and 18 arranged in series with a constant pressure drop thereacross regulated by valve 14 cooperate to achieve the fuel flow characteristics of FIG. 4, wherein the steady state fuel flow is determined primarily by valve 16, and the accelerating fuel flow is determined primarily by valve 18. During acceleration, the pressure drop across valve 16 is negligible in comparison to the pressure drop across valve 18, whereas during the steady state, the pressure drop across valve 18 is negligible in comparison to the pressure drop across valve 16.

As illustrated in FIG. 5, for any given compressor discharge pressure, the desired fuel flow to nozzle 41 increases with decreasing temperature of the inlet gases to the burner. Accordingly during starting conditions for example when the engine is cold, vent orifice 127 will be at its maximum opening, the reaction air pressure in chamber 116 will be a minimum, the actuating pressure in 106 will have the maximum effect in moving metering rod 100 upward in FIG. 3 against the resilient force of springs 119 and 124. As the engine operating conditions stabilize and the temperature of the regenerator preheated inlet gas to the burner gradually increases, the temperature responsive elements 145 exposed to the latter temperature will contract axially to enable leftward shifting of shaft 131 to restrict vent orifice 127. In consequence, the reaction pressure in chamber 116 will increase and metering rod 100 will move downward in FIG. 3 to reduce the fuel flow in accordance with the increased burner inlet temperature condition. Thus a desriable fuel-air ratio will be maintained such that the temperature of the burner and the combustion products will remain at an optimum operating temperature which must neither be so low as to result in loss of power, nor so high that the burner will be damaged.

Referring to FIG. 7, a modified fuel system adapted to be used with the gas turbine engine illustrated in FIG. 6 is shown which employs a single air pressure actuated diaphragm 115' in place of the diaphragms 105 and 115 of FIG. 3. In other respects, the fuel control system of FIG. 7 is similar to that of FIG. 1 and supplies fuel from a source 110 at substantially atmospheric pressure to the peripheral inlet of a fuel pump 120. In this instance, the fuel pump 120 is contained within the body of the throttle valve assembly 160. The latter is comparable to valve assembly 16 and comprises a rotating valve shaft 890 operably connected with compressor 59 for rotation therewith in the manner of shaft 89 of FIG. 2. Shaft 890 is keyed coaxially to the rotor of pump 120 to rotate the same and is provided with an annular recessed metering valve or orifice 680 which operates in the manner of metering valve 68 to control fuel flow between conduits 15 and 17.

Metering orifice 680 is controlled in response to the speed of rotation of compressor 59 and shaft 890 by the flyweight governors 860 acting in opposition to the spring loaded arm 750 of throttle mechanism 820, all in the manner of the corresponding parts described above in regard to FIG. 2. By suitably adjusting the throttle mechanism 820, metering valve 680 will be urged leftward to its fully open position until the compressor attains a predetermined speed of rotation, whereupon the force of flyweights 860 urging metering valve 680 rightward will neutralize the spring force of the throttle mechanism 860. Thereafter metering valve 680 will be shifted rightward with increasing compressor speed to restrict the communication between conduits 15 and 17 rapidly and maintain the desired steady state condition of operation illustrated by curve 153, FIG. 4.

In FIG. 7, pressurized fuel is discharged from pump 120 into conduit 13 in communication via filter 200 with conduit 15 and also with the high pressure side of differential pressure regulator valve 14 described above. A one-way pressure relief valve 201 connects conduit 13 with the peripheral inlet of pump 120 to bypass fuel from conduit 15 when the pump discharge pressure exceeds a predetermined maximum. For convenience and in order to simplify fluid sealing, the chamber containing flyweights 860 is in communication with the fluid inlet of pump 120 and also by means of conduit 202 with the chamber containing the mechanism actuated by throttle 820. As in FIG. 1, the bypass fuel from regulator valve 14 is returned via conduit 32 to the fuel supply 110.

The low pressure side of regulator valve 14 is connected via conduit 19 to conduit 17 through a compressor actuated valve 100' of a scheduling valve assembly 180 similar in function to the corresponding valve 18. Conduit 17 communicates with the inlet chamber 970 of scheduling valve 180 and is separated from the latter's discharge chamber 980 by metering orifice 990 within which a tapered portion 123' of valve 100' is shiftable. The left end of valve 100' is connected by retainers 117' and 118' to diaphragm 115' which is urged leftward by biasing spring 119' confined within the body of valve 180. The chamber containing spring 119' at the right side of diaphragm 115' is connected by fuel drain line 147' to the fuel supply 110. Air chamber 116' at the left side of diaphragm 115' is in communication with the compressor discharge conduit 60 by means of branch conduit 63 and restriction 120'. Thus diaphragm 115' and scheduling valve 100' are urged rightward with increasing force against biasing spring 119' to progressively open the communication between chambers 970 and 980 as the speed of rotation and discharge pressure of compressor 59 increase.

Chamber 116' is vented to atmosphere by a thermostatically controlled variable vent so as to restrict metering orifice 990 progressively with increasing temperature of the preheated combustion supporting air downstream of regenerator 61a, as described above in regard to FIG. 1. In this regard, chamber 116' is connected with metering orifice 127' of vent control assembly 125 by conduit 122'. A tapered needle valve 132' shiftable within orifice 127' is normally urged rightward by biasing spring 139' to open orifice 127'. The latter is in communication with chamber 128' of the vent control assembly 125', which in turn is vented to atmosphere by duct 130'. The right end of valve 132' engages the swinging end of lever 131' pivoted at 126' within chamber 128'. A plunger 142' of thermostat 145' exposed to the preheated air from regenerator 61a upstream of combustion chamber 41a in the manner of thermostat element 145 of FIG. 6 urges lever 131' counterclockwise with decreasing temperature to restrict orifice 127'. Plunger 142' is retracted from lever 131' to enable rightward movement of valve 132' to progressively open orifice 127' with increasing temperature.

In accordance with the operation of valve 100', when metering orifice or valve 680 is fully open, representative of the condition of compressor speed less than required by the setting of throttle mechanism 820, fuel through metering orifice 990 is scheduled to conduit 19 and thence to nozzle 41 via duct 40 and oneway check valve 203 in accordance with the discharge pressure of compressor 59 upstream of regenerator 61a, modulated by the temperature of the preheated combustion supporting air immediately prior to its entry into the combustion chamber 41a. As the operation of the compressor 59 and the flow of combustion supporting air increase, the tapered portion 123' of valve 100' will progressively shift rightward to increase the fuel flow to the nozzle 41, as indicated by the acceleration curve 152, FIG. 4. In consequence, compressor 59 will accelerate rapidly to the speed determined by the setting of throttle 820, whereupon metering groove or orifice 680 will be restricted to control and rapidly reduce the fuel flow as required for steady state operation of the gas turbine engine.

Similarly to the system of FIG. 1, the metering orifice 680 connecting conduits 15 and 17 and the metering orifice 990 are arranged in series to comprise a fuel metering system having a constant pressure drop thereacross predetermined by regulator valve 14. During conditions of acceleration or increased load on the engine, orifice 680 is open and affords a negligible pressure drop thereacross. During this acceleration period, the pressure drop in the metering system is controlled substantially entirely by metering valve 100'. Thereafter, as metering orifice 990 opens to the maximum extent determined by the acceleration fuel flow curve 152, the subsequent restriction of orifice 680 will effect substantially the entire pressure drop across the fuel metering system and the pressure drop across orifice 990 will be negligible.

I claim:

1. In a gas turbine engine, a regenerator, a combustion chamber, an engine operated air compressor, air conduit means for supplying pressurized combustion supporting air through said regenerator from said compressor to said combustion chamber, fuel conduit means for connecting said combustion chamber with a source of pressurized fuel, fuel metering means comprising first and second metering valves arranged in series in said fuel conduit means for metering the fuel flow therethrough, pressure regulating means for maintaining a substantially constant fuel pressure drop across said fuel metering means, means for maintaining steady state operation of said compressor at a predetermined speed comprising throttle means connected with said first metering valve and responsive to compressor speed for opening said first metering valve when said compressor is operating at less than said predetermined speed and for throttling said first metering valve to maintain substantially said steady state operation of said compressor at said speed, means for controlling the rate of acceleration of said compressor to said steady state operation including first and second pressure responsive means operable on said second metering valve means in opposition to each other, said air conduit means also connecting said compressor at a location upstream of said regenerator with said first and second pressure responsive means for pressure actuation thereof, said first pressure actuated means being operable on said second metering valve means to increase said fuel flow with increasing pressure, said second pressure actuated means being operable on said second metering valve means to decrease said fuel flow with increasing pressure, restricting means for restricting the connection between said air conduit means and second pressure responsive means, adjustable vent means for venting the pressure from said second pressure responsive means at a location downstream of said restricting means, and means responsive to the temperature of the inlet gases to said combustion chamber at a location between the latter and said regenerator for restricting said adjustable vent means with increasing temperature.

2. In a gas turbine engine, a regenerator, a combustion chamber, an engine operated air compressor for supplying combustion supporting air through said regenerator to said chamber, fuel conduit means for connecting said combustion chamber with a source of pressurized fuel, fuel metering means comprising first and second metering valves arranged in series in said fuel conduit means for metering the fuel flow therethrough, pressure regulating means for maintaining a substantially constant fuel pressure drop across said fuel metering means, means for maintaining steady state operation of said compressor at a predetermined speed comprising throttle means connected with said first metering valve and responsive to compressor speed for opening said first metering valve when said compressor is operating at less than said predetermined speed and for throttling said first metering valve to maintain substantially said steady state operation of said compressor at said speed, means for controlling the rate of acceleration of said compressor to said steady state operation including pressure actuated means secured to said second metering valve means to shift the same, air conduit means connecting said compressor with one side of said pressure actuated means to actuate the same with increasing pressure to urge shifting of said second metering valve means to increase said fuel flow, said air conduit means having a portion connecting said compressor with the other side of said pressure actuated means to actuate the same with increasing pressure to urge shifting of said valve means to decrease said fuel flow, a first restriction in the connection between said compressor and said other side, a second restriction venting the pressure at said other side, one of said restrictions being variable, and temperature responsive means responsive to the temperature of the inlet gases to said combustion chamber at a location between the latter and said regenerator for progressively changing said one restriction with changes in said temperature to decrease fuel flow with increasing temperature.

3. In a gas turbine engine, a regenerator, a combustion chamber, an engine operated air compressor for supplying combustion supporting air through said regenerator to said chamber, fuel conduit means for connecting said combustion chamber with a source of pressurized fuel, fuel metering means comprising first and second metering valves arranged in series in said fuel conduit means for metering the fuel flow therethrough, pressure regulating means for maintaining a substantially constant fuel pressure drop across said fuel metering means, means for maintaining steady state operation of said compressor at a predetermined speed comprising throttle means connected with said first metering valve and responsive to compressor speed for opening said first metering valve when said compressor is operating at less than said predetermined speed and for throttling said first metering valve to maintain substantially said steady state operation of said compressor at said speed, means for controlling the rate of acceleration of said compressor to said steady state operation including pressure actuated means secured to said second metering valve means to shift the same, air conduit means connecting said compressor at a location upstream of said regenerator with one side of said pressure actuated means to actuate the same with increasing pressure to urge shifting of said second metering valve means to increase said fuel flow, said air conduit means having a portion connected with the other side of said pressure actuated means to actuate the same with increasing pressure to urge shifting of said second metering valve means to decrease said fuel flow, said one side having a larger effective area than said other side, resilient biasing means yieldingly urging shifting of said second metering valve means to decrease said fuel flow, a first restriction in the connection between said compressor and said other side, an adjustable vent means for venting the pressure at said other side, and means responsive to the temperature of the inlet gases to said combustion chamber at a location between the latter and said regenerator for restricting said adjustable vent means with increasing temperature.

References Cited by the Examiner

UNITED STATES PATENTS

| | | | |
|---|---|---|---|
| 2,429,005 | 10/47 | Watson | 60—39.28 |
| 2,691,268 | 10/54 | Prentiss | 60—39.28 |
| 2,697,328 | 12/54 | Lee | 60—39.28 |
| 2,714,803 | 8/55 | Abild | 60—35.6 |
| 2,829,489 | 4/58 | Meyer | 60—39.28 |
| 2,832,193 | 4/58 | Wood | 60—39.28 |
| 2,879,643 | 3/59 | Stroh | 60—39.28 |
| 2,946,189 | 7/60 | Basford | 60—39.28 |
| 2,971,339 | 2/61 | Gold | 60—39.28 |
| 2,976,683 | 3/61 | Flanigan | 60—39.28 |

FOREIGN PATENTS 1,174,369  11/58  France.

SAMUEL LEVINE, *Primary Examiner.*